May 6, 1958     E. FOSSATI     2,833,161

MECHANICAL STEERING SYSTEM FOR TRACK VEHICLES

Filed July 20, 1954

INVENTOR.
EMILIO FOSSATI,
BY
Robert B. Larson
ATTORNEY

United States Patent Office 2,833,161
Patented May 6, 1958

2,833,161
MECHANICAL STEERING SYSTEM FOR TRACK VEHICLES

Emilio Fossati, Tortona, Italy

Application July 20, 1954, Serial No. 444,619

4 Claims. (Cl. 74—710.5)

It is known that in steering track laying type vehicles, a point of support acting as a fulcrum is utilized, said fulcrum permitting the vehicle to be turned in the direction required. In practise such point of support is supplied by an element of the track for the wheel, on the inner side with respect to the curve to be turned.

However, this system, although generally employed, causes many inconveniences such as dragging on the ground and therefore difficulties in steering.

It is the purpose of the present invention to eliminate this fundamental inconvenience by utilizing a steering mechanism still based on a rotation fulcrum but eliminating attrition of the vehicle against the ground, thereby providing easy steering.

Substantially, the present invention displaces the fulcrum to the line of the center of gravity of the figure formed by the points of contact of the wheels with the ground or, in other words, on the intersection point of the diagonal lines joining alternate wheels of the vehicle, and through the action of suitable clutches, a set of gears which will cause each axle shaft to revolve in an opposite direction and at a different speed with respect to the other, so that the wheel inside the curve shall turn more slowly than the outside wheel which will turn the opposite way and faster than said inside wheel.

To achieve this result, the device according to the invention comprises gear means of which one may be, alternately, connected to or disconnected from the unit, by means of clutches, so as to revolve either at a uniform speed and in the same direction, or, when required, at a reduced speed and in the opposite direction. The clutches are controlled by an adequate number of two-fulcrumed levers.

The present invention is illustrated, schematically and by way of example, in a preferred form of embodiment, in the attached drawings wherein.

Figure 1:
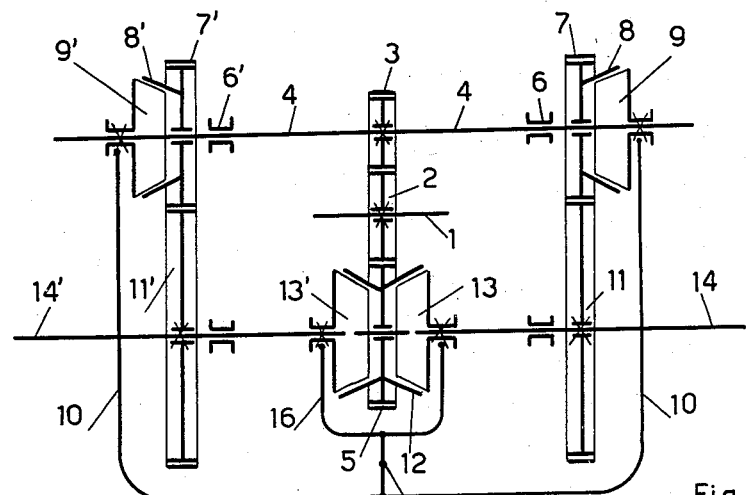
Figure 1 is a diagrammatic sketch of the system.
Figure 2:
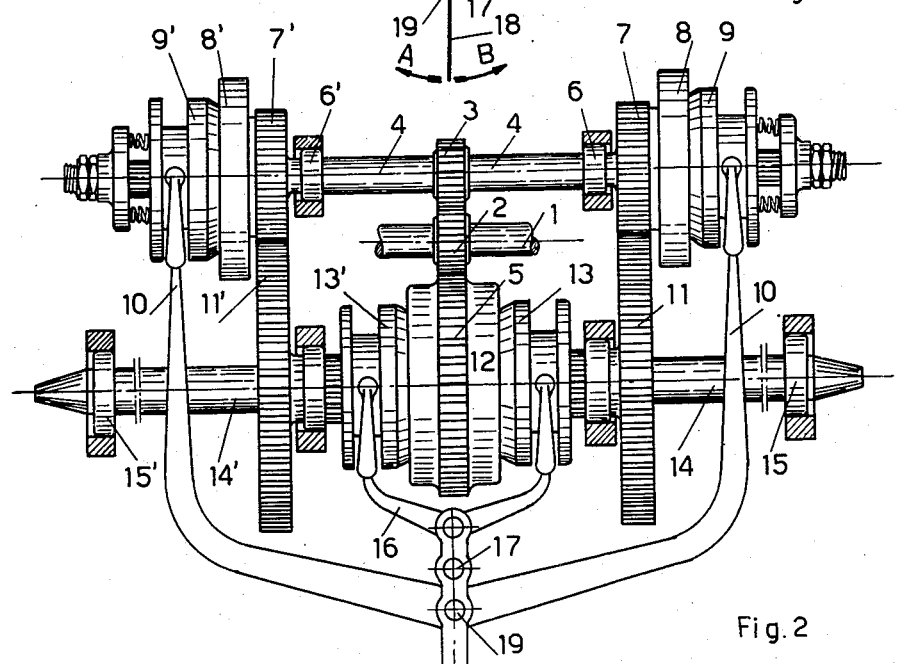
Figure 2 is a plan view of one embodiment of the system.

In said figures, spur gear 2 is keyed on driving axle 1 and meshes at its one end with spur gear 3 (keyed on drive shaft 4) and at its other side with crown wheel 5. On drive shaft 4, which revolves in ball bearings 6 and 6', are rotatably mounted gear wheels 7 and 7' which are rigid with clutch boxes 8 and 8' containing cone clutches 9 and 9', which are keyed on shaft 4. Clutches 9 and 9' are urged into engagement by springs as shown in Fig. 2. The clutches are controlled by fork 10 which may be pivoted either in direction A to disengage clutch 9' or in direction B to disengage clutch 9.

As mentioned above, spur gear 2 meshes with crown wheel 5 which is keyed on freely journalled clutch box 12 having clutches 13 and 13', keyed on axle shafts 14 and 14' supported in ball bearings 15 and 15'. Said clutches 13 and 13', however, are controlled by fork 16 fulcrumed at 17 and rigid with lever 18 connected at 19 and controlling fork 10 and consequently clutches 9 and 9' so that each maneuver (for instance throwing into engagement) of clutch 13 or 13' shall cause the opposite maneuver (for instance disengaging) of clutch 9 or 9'.

Now, on the basis of the principle of the present invention, according to which the wheels inside the bend to be turned are made to turn at a reduced speed and the outside wheels are made to turn at an increased speed causing the vehicle to turn on the fulcrum passing on the line of the center of gravity of the figure formed by the points of contact of the wheels with the ground, the present device operates as follows:

Supposing the vehicle must be steered to the left, lever 18 is shifted in the direction shown by arrow A, thus disengaging clutch 9' and engaging gear clutch 13', so that axle shaft 14' which is rigid with clutch 13' is made to turn through crown wheel 5, its turning speed being lower (according to pre-arranged ratios) than that of axle shaft 14 the turning of which is controlled directly by gears 2, 3, 7 and 11. In this manner, rotation of axle shaft 14' is obtained at a lower speed and in the opposite direction with respect to axle shaft 14 owing to the elimination of the connection between 7' and 11'. To steer the vehicle to the right it is merely necessary to shift lever 18 in the direction of arrow B in order to cause the same movements as above but in the opposite way. When the vehicle is to be kept on a practically straight course, lever 18 is kept in the center position as illustrated and the two axle shafts 14 and 14' revolve in the same direction and at the same speed because, owing to the fact clutches 13 and 13' do not intervene, they take on a uniform motion in relation to gear couples 7—11 and 7'—11'. In the above described form of embodiment shafts 14, 14' are considered as being connected to the driving wheels of a track laying type vehicle, but, in some particular cases, they may also be employed with other mechanisms or groups of mechanisms requiring simultaneous unidirectional motion or alternately contrarywise motion.

Obviously the mechanical device described above may in practice be subject to constructional variations in respect of the relative position of its various components without departing from the framework of the invention.

I claim:

1. In a device of the class described comprising, in combination, a driving shaft, a pair of wheel axles, first gear means interconnecting said driving shaft and said wheel axles for rotating the axles in the same direction, said first gear means including a first pair of clutches, second gear means engaging said driving shaft, a second pair of clutches for selectively interconnecting said second gear means with one of said wheel axles to rotate said one axle in the opposite direction and means for simultaneously and selectively disengaging one of said first pair of clutches and engaging one of said second pair of clutches.

2. In combination, a driving shaft having a pinion gear thereon, a second shaft adjacent said driving shaft, a spur gear on said second shaft engaging said pinion gear, a first pair of gears freely rotatable on said second shaft, first means mounted on said second shaft and engageable with said first pair of gears to cause the same to rotate with said second shaft, a pair of driven shafts, a second pair of gears mounted on said driven shafts and engageable with said first pair of gears to rotate therewith, and second means including clutch means engageable with said pinion gear and selectively engageable with one of said driven shafts to rotate said one shaft oppositely and at a lower speed than the other shaft, and means for simultaneously disengaging said first means and engaging said second means selectively with one of said driven shafts.

3. A device according to claim 2 wherein said first means includes friction members mounted on said first pair of gears and clutch means slidable on said second shaft.

4. A device according to claim 2 wherein said last-named means includes a pivoted lever arm.

References Cited in the file of this patent

UNITED STATES PATENTS

| | | |
|---|---|---|
| 1,403,407 | Hammond et al. | Jan. 10, 1922 |
| 1,453,265 | Bird | May 1, 1923 |
| 1,855,209 | Turzicky | Apr. 26, 1932 |
| 2,332,838 | Borgward | Oct. 26, 1943 |
| 2,353,554 | Gates | July 11, 1944 |
| 2,389,498 | Gates | Nov. 20, 1945 |
| 2,599,058 | Johansen et al. | June 3, 1952 |
| 2,689,488 | Storer et al. | Sept. 21, 1954 |